US011136120B2

(12) United States Patent
Bosworth et al.

(10) Patent No.: US 11,136,120 B2
(45) Date of Patent: Oct. 5, 2021

(54) GROUND OPERATIONS FOR AUTONOMOUS OBJECT PICKUP

(71) Applicant: Aurora Flight Sciences Corporation, Manassas, VA (US)

(72) Inventors: William Robert Bosworth, Cambridge, MA (US); Margaret Reagan, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 425 days.

(21) Appl. No.: 16/153,314

(22) Filed: Oct. 5, 2018

(65) Prior Publication Data
US 2020/0108927 A1 Apr. 9, 2020

(51) Int. Cl.
*B64C 39/02* (2006.01)
*B25J 15/00* (2006.01)
(Continued)

(52) U.S. Cl.
CPC ............ *B64C 39/024* (2013.01); *B25J 15/00* (2013.01); *B64C 25/405* (2013.01); *B64D 9/00* (2013.01);
(Continued)

(58) Field of Classification Search
CPC ................ B64C 39/024; B64C 25/405; B64C 2201/024; B64C 2201/128; B25J 15/00;
(Continued)

(56) References Cited

U.S. PATENT DOCUMENTS

| 5,920,276 A | 7/1999 | Frederick |
| 6,927,694 B1 | 8/2005 | Smith et al. |

(Continued)

FOREIGN PATENT DOCUMENTS

| DE | 102014211852 A1 | 12/2015 |
| EP | 2916309 A1 | 9/2015 |

(Continued)

OTHER PUBLICATIONS

Extended European search report for Application No. 18192059.6, dated Feb. 4, 2019.
(Continued)

*Primary Examiner* — Geepy Pe
*Assistant Examiner* — Kyle J Kingsland
(74) *Attorney, Agent, or Firm* — Michael Stanley Tomsa; McAndrews, Held & Malloy, Ltd.; Eugene H. Nahm (57) ABSTRACT

An aircraft based object acquisition system includes an airframe capable of flight. The system includes one or more sensors configured to identify a physical characteristic of an object or an environment. An object acquisition mechanism is coupled to the airframe and configured to manipulate and secure the object to the airframe. A ground based movement system may be configured to position the airframe such that the object is accessible to the object acquisition mechanism. A processor is communicatively configured to control operation of the ground based movement system to approach the object based at least in part on information from the one or more sensors, and to control the object acquisition mechanism to pick up the object based at least in part on information from the one or more sensors.

22 Claims, 5 Drawing Sheets

(51) Int. Cl.
| | |
|---|---|
| *B64C 25/40* | (2006.01) |
| *B64D 9/00* | (2006.01) |
| *G05D 1/00* | (2006.01) |
| *G05D 1/02* | (2020.01) |
| *G05D 1/04* | (2006.01) |
| *G06K 9/00* | (2006.01) |

(52) U.S. Cl.
CPC ......... *G05D 1/0088* (2013.01); *G05D 1/0212* (2013.01); *G05D 1/0248* (2013.01); *G05D 1/042* (2013.01); *G06K 9/0063* (2013.01); *B64C 2201/024* (2013.01); *B64C 2201/128* (2013.01)

(58) Field of Classification Search
CPC ...... B64D 9/00; G05D 1/0088; G05D 1/0212; G05D 1/0248; G05D 1/042; G06K 9/0063
See application file for complete search history.

(56) References Cited

U.S. PATENT DOCUMENTS

| | | | |
|---|---|---|---|
| 6,948,681 | B2 | 9/2005 | Stupakis |
| 8,260,736 | B1 | 9/2012 | Lear et al. |
| 8,265,818 | B2 | 9/2012 | Allport |
| 8,384,534 | B2 | 2/2013 | James et al. |
| 8,437,890 | B2 | 5/2013 | Anderson et al. |
| 9,296,401 | B1 | 3/2016 | Palmer et al. |
| 9,557,742 | B2 | 1/2017 | Paduano et al. |
| 9,919,712 | B1 | 3/2018 | Doyen et al. |
| 9,958,875 | B2 | 5/2018 | Paduano et al. |
| 10,067,502 | B1 * | 9/2018 | Delp .................. G06Q 10/20 |
| 2001/0026316 | A1 | 10/2001 | Senatore |
| 2003/0093187 | A1 | 5/2003 | Walker |
| 2008/0125920 | A1 | 5/2008 | Miles et al. |
| 2009/0050750 | A1 | 2/2009 | Garrec et al. |
| 2009/0055038 | A1 | 2/2009 | Garrec et al. |
| 2010/0152933 | A1 | 6/2010 | Smoot et al. |
| 2011/0017863 | A1 | 1/2011 | Goossen et al. |
| 2011/0068224 | A1 | 3/2011 | Kang et al. |
| 2011/0139928 | A1 | 6/2011 | Morris et al. |
| 2011/0174931 | A1 | 7/2011 | Berland |
| 2011/0245996 | A1 | 10/2011 | Orsulak et al. |
| 2012/0065881 | A1 | 3/2012 | McIver et al. |
| 2012/0075119 | A1 | 3/2012 | Dorneich et al. |
| 2012/0091259 | A1 | 4/2012 | Morris et al. |
| 2012/0233447 | A1 | 9/2012 | Fitzgerald |
| 2012/0319869 | A1 | 12/2012 | Dorfmann et al. |
| 2013/0008998 | A1 | 1/2013 | Morris et al. |
| 2013/0054054 | A1 | 2/2013 | Tollenaere et al. |
| 2013/0116856 | A1 | 5/2013 | Schadeck |
| 2013/0200207 | A1 | 8/2013 | Pongratz et al. |
| 2014/0124621 | A1 | 5/2014 | Godzdanker et al. |
| 2014/0180914 | A1 | 6/2014 | Abhyanker |
| 2014/0217230 | A1 | 8/2014 | Helou, Jr. |
| 2014/0240132 | A1 | 8/2014 | Bychkov |
| 2014/0276090 | A1 | 9/2014 | Breed |
| 2014/0316616 | A1 | 10/2014 | Kugelmass |
| 2015/0012186 | A1 | 1/2015 | Horseman |
| 2015/0323932 | A1 | 11/2015 | Paduano et al. |
| 2016/0090097 | A1 | 3/2016 | Grube et al. |
| 2016/0229534 | A1 | 8/2016 | Hutson |
| 2017/0029103 | A1 | 2/2017 | Chang et al. |
| 2017/0073071 | A1 | 3/2017 | Salzmann et al. |
| 2017/0090480 | A1 | 3/2017 | Ho et al. |
| 2017/0277185 | A1 | 9/2017 | Duda et al. |
| 2018/0134381 | A1 * | 5/2018 | Rimanelli .............. B64D 9/00 |
| 2019/0079509 | A1 * | 3/2019 | Bosworth ............ G06Q 10/083 |
| 2019/0369641 | A1 * | 12/2019 | Gillett ................ G05D 1/0278 |

FOREIGN PATENT DOCUMENTS

| | | | |
|---|---|---|---|
| EP | 2933788 | A2 | 10/2015 |
| GB | 2543503 | A | 4/2017 |
| WO | 2015/200224 | A2 | 12/2015 |
| WO | 2016/118672 | A2 | 7/2016 |
| WO | 2016/164416 | A1 | 10/2016 |

OTHER PUBLICATIONS

Extended European search report for Application No. 18194074.3, dated Feb. 11, 2019.
Kiesielowski, E. et al., "Technical Report No. LWL-CR-09M71, Rough Terrain Ground Handling System for Helicopters," Final Report, U.S. Army Land Warfare Laboratory, Apr. 1974.
Akerstedt, T. & Gillberg, M.; Subjective and Objective Sleepiness in the Active Individual., Intern. J. Neurosci., 1990, 52: pp. 29-37.
M. Whalley et al., "The NASA/Army Autonomous Rotorcraft Project," American Helicopter Society 59th Annual Forum, May 6-8, 2003.
Bergasa, L. M., Nuevo, J., Sotelo, M. A., Barea, R., & Lopez, M. E.; Real-Time system for Monitoring Driver Vigilance, IEEE Transactions on Intelligent Transportation Systems, vol. 77, No. 1, Mar. 2006, 63-77.
Oman, C. M., & Liu, A. M. (2007). Locomotive In-Cab Alerter Technology Assessment, Excerpted from: Development of Alternative Locomotive In-Cab Alerter Technology: Final Technical Report DOT Volpe PR#79-3389, DTS-79, Volpe National Transportation Systems Center, Cambridge, MA, Nov. 30, 2006.
Ji, Q., Lan, P., & Looney, C.; A Probabilistic Framework for Modeling and Real-Time Monitoring Human Fatigue. IEEE Transactions on Systems, Man, and Cybernetics—Part A: Systems and Humans, 2006, 36(5), 862-875.
Whalley, M. et al., "Field-Testing of a Helicopter UAV Obstacle Field Navigation and Landing System," American Helicopter Society 65th Annual Forum Proceedings, Ft. Worth, Texas, May 2009.
S. Lange et al., "A Vision Based Onboard Approach for Landing and Position Control of an Autonomous Multirotor UAV in GPS-Denied Environments".
Riener, A., & Ferscha, A.; Reconfiguration of Vibro-tactile Feedback based on Drivers' Sitting Attitude. 2009 Second International Conferences on Advances in Computer-Human Interactions (pp. 234-242). IEEE.
K-MAX Unmanned Aircraft System brochure, Copyright 2010 Lockheed Martin Corporation.
Chamberlain, L. et al., "Self-Aware Helicopters: Full-Scale Automated Landing and Obstacle Avoidance in Unmapped Environments," American Helicopter Society 67th Annual Forum Proceedings, Virginia Beach, Virginia, May 2011.
J. Paduano et al., "TALOS: An Unmanned Cargo Delivery System for Rotorcraft Landing to Unprepared Sites," American Helicopter Society 71st Annual Forum Proceedings, Virginia Beach, Virginia, May 2011.
"Autonomous Aerial Cargo/Utility System (ARCUS): Concept of Operations (CONOPs)," The Office of Naval Research, Dec. 22, 2011.
Dollar, Aaron "Aerial Grasping and Manipulation," the GRAB Lab, Yale University, 2012.
M. Verbandt et al., "Robust marker-tracking system for vision-based autonomous landing of VTOL UAVs," IMAV 2014.
Heikenfeld, Jason, "Sweat Sensors Will Change How Wearables Track Your Health," IEEE Spectrum, Oct. 22, 2014.
Gould, Joe, "Precision Airdrop System Land at CENTCOM on Time," Defense News, Dec. 19, 2014.
Peláez, G.A., Garcia, F., Escalera, A., & Armingol, J. M.; Driver Monitoring Based on Low-Cost 3-D Sensors, IEEE Transactions on Intelligent Transportation Systems, 2014, 15(4), pp. 11687-11708.
J. Paduano et al., "TALOS: An unmanned cargo delivery system for rotorcraft landing to unprepared sites," Jan. 2015.
Abd-Elfattah, H. M., Abdelazeim, F. H., & Elshennawy, S.; Physical and cognitive consequences of fatigue: A review. Journal of Advanced Research (2015) 6, 351-358.
Solomon, C., & Wang, Z.; Driver Attention and Behavior Detection with Kinect. J. Image Graph, 3(2), Dec. 2015, 84-89.

(56) References Cited

OTHER PUBLICATIONS

Morton, Kye et al., "Development of a Robust Framework for an Outdoor Mobile Manipulatio UAV," 978-1-4673-7676-1/16/$31.00 © 2016 IEEE.
Pilot incapacitation occurrences 2010-2014, Australian Transport Safety Bureau, Report No. AR-2015-096, published Feb. 18, 2016.
IPR Petition PTAB-IPR2018-01704—date Sep. 11, 2018.
R. Brockers et al., "Autonomous landing and ingress of micro-air-vehicles in urban environments based on monocular vision".
Nuss, Andrew "Aerial Reconfigurable Embedded System (ARES)," Defense Advanced Research Projects Agency, Program Information, https://www.darpa.mil/program/aerial-reconfigurable-embedded-system.
Wikipedia, "Electronic Nose".
https://www.indiegogo.com/projects/driver-assistance-system-for-train-conductors#/.
Office of Naval Research, Broad Agency Announcement No. 12-004.
Extended European search report for Application No. 19200405.9, dated Jan. 17, 2020.
Extended European search report for Application No. 18195738.2, dated Feb. 13, 2019.
Extended European search report for Application No. 18195747.3, dated Feb. 25, 2019.

\* cited by examiner

GROUND OPERATIONS FOR AUTONOMOUS OBJECT PICKUP

FIELD

This present disclosure generally relates to aircraft systems, more specifically, to aircraft and aircraft systems capable of identification, acquisition, transportation, and emplacement of objects.

BACKGROUND

The prevalence of aerial package delivery (APD) is a growing area in many sectors, including commercial and defense. Package delivery comprises at least two activities; for example, packages must be picked up, and then dropped off (i.e., delivered). Package delivery also occurs in at least two operating environments: the packages can be picked up or dropped off in controlled and/or mapped environments (e.g., an airport or base), or less developed, less controlled environments (e.g., austere, previously unexplored environments such as unstructured remote locations; e.g., "in the field").

In current practice, package delivery is generally performed with human operators. For instance, human operators are required to both operate the means of transport (e.g., the vehicle transporting the package, such as an aircraft or lorry), and be on the ground to upload the package (e.g., handling and securing the package).

In contrast, unmanned aerial vehicle (UAV) have gained prevalence in the commercial and defense markets. Indeed, commercial low-cost UAV development is an active and growing industry where UAV technology has proven to be a valuable tool for mission profiles involving intelligence, surveillance, reconnaissance, and payload delivery. UAV companies continue to introduce UAVs with greater capabilities and, more recently, UAVs have been employed to manipulate and transport objects. For example, Amazon recently introduced Amazon Prime Air™, which is a UAV-based delivery system, designed to safely delivery packages to customers.

The current generation of low-cost commercial off-the-shelf (COTS) UAVs (e.g., consumer UAVs) is already capable of performing relatively safe, small-scale operations. Existing consumer UAVs, however, suffer from aerodynamic instability and inaccuracy, which makes such UAVs incapable of precision grasping and emplacement of objects. Indeed, when the payload is large (e.g., more than a few kilograms and/or greater than a meter in volume), the vast majority of UAVs are poorly equipped for transporting such payloads.

Accordingly, a need exists for a UAV that is capable of high-precision manipulation, acquisition, transportation, and emplacement of objects in an unimproved environment (e.g., an austere environment). A need also exists for an object acquisition system capable of retrofitting a UAV to compensate for aerodynamic instability and inaccuracy of the platform thereby providing safer, more reliable object transportation.

SUMMARY

Disclosed herein are aircraft and aircraft systems capable of manipulation, acquisition, transportation, and emplacement of objects, including, inter alia, an object acquisition system for an aircraft.

According to a first aspect, an aircraft-based autonomous object acquisition system comprises: an airframe capable of flight; one or more sensors configured to sense a physical characteristic of an object or an environment; an object acquisition mechanism coupled to the airframe, the object acquisition mechanism configured to manipulate and secure the object to the airframe; a ground based movement system configured to position the airframe such that the object is accessible to the object acquisition mechanism; and a processor communicatively configured to: control operation of the ground based movement system to approach the object based at least in part on information from the one or more sensors; and control the object acquisition mechanism to pick up the object based at least in part on information from the one or more sensors.

In certain aspects, the processor is further configured to identify a landing zone within a predetermined distance of the object and to control the aircraft to land in the landing zone.

In certain aspects, the processor is further configured to identify a pathway between the landing zone and the object based at least in part on data from one or more sensors.

In certain aspects, the one or more sensors comprises at least one of a radar, a LIDAR, an IR, a sonar, or an optical sensor.

In certain aspects, the optical sensors further comprises a red/green/blue (RGB) camera.

In certain aspects, the object acquisition mechanism comprises a manipulation mechanism to adjust a position of the object and a securing mechanism to secure the object to the airframe.

In certain aspects, the object acquisition mechanism is configured to removably couple to the aircraft.

In certain aspects, the securing mechanism is removably coupled with the object acquisition mechanism to enable the securing mechanism to be interchanged with a different securing mechanism.

In certain aspects, the securing mechanism comprises at least one of a robotic arm, a winch, or a magnet.

In certain aspects, the object acquisition mechanism is configured to move independently of the ground movement system to allow the aircraft to move while the object acquisition mechanism maintains contact with the object.

In certain aspects, the object acquisition mechanism is further configured to secure the object externally to the airframe.

In certain aspects, the ground based movement system comprises landing gear for the aircraft.

In certain aspects, the ground based movement system comprises a wheeled system or a track system.

In certain aspects, the object acquisition mechanism comprises one or more feedback sensors to provide feedback data to the processor when interacting with the object.

In certain aspects, the one or more feedback sensors comprises an optical sensor or a pressure sensor communicatively coupled with the processor.

In certain aspects, the object comprises a marker to aid in determining the physical characteristic of the object.

In certain aspects, the object comprises a code representative of the physical characteristic.

In certain aspects, the physical characteristic is one of height, length, width, weight, or shape of the object.

In certain aspects, the object acquisition mechanism is mounted to a side of the airframe.

According to a second aspect, a method of acquiring an object from an aircraft-based autonomous system comprises: identifying, via one or more sensors, an area that is both suitable for landing the aircraft and accessible to an object via a ground based path; landing the aircraft in the identified area; positioning the aircraft, via a ground based movement system, such that the object is accessible to the object acquisition mechanism based at least in part on information from the one or more sensors; and securing, via an object acquisition mechanism, the object to the aircraft based at least in part on information from the one or more sensors.

In certain aspects, the method further comprises: identifying, via the one or more sensors, a physical characteristic of the object; securing the object to the aircraft by a securing mechanism of the object acquisition mechanism based at least in part on the physical characteristic; and transporting the secured object.

In certain aspects, the physical characteristic is one of height, length, width, weight, or shape of the object.

DESCRIPTION

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead is being placed upon illustrating the principles of the devices, systems, and methods described herein.

DETAILED DESCRIPTION

In an improvement over conventional systems, the hybrid flight and ground enabled aircraft described herein is capable of landing, from flight, on the ground near objects to be acquired (e.g., packages, payloads, containers, evacuees, detritus, vehicles, etc.), and then traveling, by ground enabled means, to a position relative to the object suitable for manipulating and securing the object for transport. In particular, landing near the object (e.g., about two rotor widths from the object, or about 20 m, in the case of a propeller based VTOL aircraft) without the accuracy and proximity required to secure the object in a single step, mitigates potential damage to the aircraft and/or the object due to any inadvertent contact between the aircraft and the object. Inadvertent contact between the aircraft and the object can be potentially catastrophic if, for example, the aircraft became compromised (e.g., a broken rotor), or if a valuable object is damaged (most notably in a casualty evacuation, or CASEVAC, scenario). Further, the requirement for computer intensive, accurate landing algorithms is avoided, all of which eliminates significant risks. The benefits realized through the disclosed acquisition system provide significant advantages for the commercial and defense sectors, as described in greater detail, below.

The disclosed acquisition system couples the capabilities of an aircraft with a ground transportation system to acquire, secure, transport, and deliver an object. In an example, a helicopter or other VTOL aircraft identifies a target object and surveys the area adjacent to the object. The helicopter identifies an area suitable for landing (e.g., flat terrain), lands, then employs the ground transportation system, such as a motorized wheeled drive system, to travel to the object. The ground transportation system positions the helicopter proximate to the object, such that the object is within reach of an object acquisition mechanism capable of manipulating and securing the object. Once the object acquisition mechanism has secured the object for transport, the helicopter transports the object, either by taking flight or by use of the ground transportation system. In accordance with the acquisition system disclosed herein, the risk of damage to the aircraft and the object (e.g., payload) is significantly lower, and performance requirements of the flight and landing systems are simplified as well, thus there is much interest in automating APD to increase throughput, decrease cost, and reduce risk.

An aspect of the system that provides significant benefits over conventional systems is the incorporation of autonomous technology. For instance, flight, ground movement, and the object acquisition mechanism, as well as a manipulation mechanism and/or securing mechanism associated with the object acquisition mechanism, can be configured to operate autonomously. In other words, the system can execute various logic routines, informed by one or more sensors, stored data, trend analysis, etc., to effectively identify, approach, secure, transport, and deliver an object, without the need for human intervention.

The disclosed acquisition system employs a ground transportation system coupled to an aircraft of a suitable size to pick up and transport objects, such as containers, vehicles, personnel, and other types of payloads. The aircraft is to land on navigable terrain (e.g., flat, reasonably stable, etc.), then drive over to the object, acquire the object, and fly away. In some examples, the aircraft is directed to acquiring the object and relocating it on the ground, such as to a ground-based delivery point, a pre-designated location (e.g., under cover, a tree-line, etc.), or other area as the mission or environment provides. In yet other examples, the aircraft may be configured to deliver an object from one location to a desired second location, such as by transporting the object from one location and landing in a landing zone within the vicinity of the second location, then driving to the second location for object delivery. The proposed system acknowledges that some aircraft, such as helicopters and other VTOL aircraft, may have powered drive systems for movement on the ground. The present disclosure pertains to the use of the wheeled system to enable the "land, drive, pickup, fly-away" concept of operations for autonomous object pickup in unimproved terrain.

While airports typically employ people and machines to load or unload objects, the presently disclosed acquisition system is advantageously configured to acquire and/or deliver an object using aircraft in locations lacking such infrastructure to transport the objects to or from the aircraft. Generally, this means the aircraft is configured for picking up and/or delivering objects in unimproved, austere, or unexplored terrain. The disclosed acquisition system may allow for the following autonomous object acquisition and/or delivery operations: 1) land an aircraft in unimproved terrain on navigable (e.g., substantially flat) ground; 2) identify the object and drive towards the object; 3) manipulate and secure the object; and 4) transport the object, by flight or ground based means, for delivery.

Some conventional acquisition systems have made attempts for aerial vehicle object transport, none without shortcomings. For instance, a slung load system drops a cable to secure an object, which dangles in flight beneath the aircraft during transport. One major drawback of the slung-load approach impacts flight dynamics, which are greatly compromised by the vibrational/oscillatory modes induced by the object, as the cable system is highly under-damped with a very low oscillating frequency. The flight dynamics would be affected, requiring complex systems to counter any forces acting on the aircraft. Further, it would also be challenging to autonomously acquire an object using a sling-load, due to the difficulty in placing a rope/hook precisely onto an object connector. Doing so reliably requires a device/robot/human operator on the ground to make such a connection.

Another acquisition system employs external latching, which comprises latches mounted near the body of an aircraft. Thus, the object is carried externally, but held rigidly near the center of mass of the aircraft. This provides favorable flight dynamics compared to slung load, and may be easily operated. A significant drawback of the external latching approach is that the aircraft is expected to land nearby the object to be acquired. This may lead to uninvited risks involved during landing. As noted, if the helicopter skids drop down onto the object, then the aircraft and/or the object could be catastrophically damaged.

An example of the external latching concept is the use of a conventional robot arm on the UAV, so-called "robot arm grasping." The robot arm may enable picking up objects outside of the rotor area of the aircraft. Conceptually, this is similar to external latching, which has increased reach at the cost of lift capacity. However, to secure an object of a large size would require a prohibitively large robotic arm, with power, stabilization and control systems that would require a large flight platform. That in addition to any cargo space used to secure a payload, which would be difficult and uneconomical.

A risk of some conventional concepts, particularly with human-operated aerial vehicles attempting to acquire an object, is the potential for inadvertent contact between the aircraft and the environment and/or object. This contact can harm the flight dynamics, the object, or the aircraft itself. By contrast, the presently disclosed acquisition system allows for the aircraft to safely land away from any disturbances or obstacles on the ground, and then to travel towards the object in order to deploy an object-manipulation/securing system.

Some flight transportation systems employ a separate but controlled ground vehicle configured to exit the aircraft and acquire an object. However, this operation is capable of acquiring only relatively small objects, as the lifting capacity of such a system is limited in both mass and volume. Further, the addition of the ground vehicle limits load capacity of the aircraft, as well as additional systems for operating the ground vehicle and coordinating with the aircraft.

Disclosed is an autonomous aircraft with an object acquisition system (e.g., which includes an object acquisition mechanism). The autonomous aircraft may acquire and secure an object. In some examples, the autonomous aircraft could support a human operator, however, manipulation of the object and/or ground operations are conducted autonomously (e.g., no person or vehicle is needed to exit the aircraft and acquire or otherwise secure the object to the aircraft).

In some examples, the object acquisition system may include a robot or robotic features attached to the aircraft. For example, the object acquisition system can secure an object (e.g., packages, containers, etc.) at the side or bottom of the aircraft (e.g., below the aircraft), or objects could be secured by a sling-load mechanism. Thus, as an improvement over conventional designs, the object need not be brought into the cabin of the aircraft.

The aircraft may be equipped with landing gear and/or other devices configured as a ground transportation system, such as wheels, legs, tracks, skids, etc., which allows the aircraft to land and then travel over-ground (e.g., pavement, unimproved terrain, etc.) towards the object. The use of the ground transportation system reduces the need to land near or over the object, as is the case with conventional systems.

The presently disclosed aircraft may include a retro-fit system for converting an existing aircraft with skids (e.g., a UH-1, UH-60, AEH-1 or other VTOL aircraft) into a powered drive system vehicle (e.g., wheels, legs, tracks, etc.). In addition to retrofitting a powered drive system, the disclosed aircraft can include an autonomous guidance system. For example, operations to support object pickup, during both flight and ground-based activities of the aircraft, may be done autonomously.

Thus, as disclosed herein, the aircraft includes the operational capability to identify a landing zone (including on unimproved terrain), vertically land in the landing zone, identify an object and acquire information on such an object, travel towards the object via a ground based drive system, and acquire and secure the object in order to transport and/or deliver the object (by air or ground). For example, by employing an aircraft capable of landing, then driving to acquire and/or deliver the object, objects may be transported more safely and in greater proximity to sensitive areas (e.g., populated areas, near improved structures, tree-lines, etc.).

Preferred embodiments of the present disclosure will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like, are words of convenience and are not to be construed as limiting terms. The various data values (e.g., voltages, seconds, etc.) provided herein may be substituted with one or more other predetermined data values and, therefore, should not be viewed limiting, but rather, exemplary. For this disclosure, the following terms and definitions shall apply:

The terms "aerial vehicle" and "aircraft" refer to a machine capable of flight, including, but not limited to, fixed wing aircraft, unmanned aerial vehicle, variable wing aircraft, and vertical take-off and landing (VTOL) aircraft.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

Disclosed herein is an aircraft configured to achieve object acquisition and/or delivery in unimproved environments, while avoiding the many pitfalls and shortcomings of conventional systems. For example, the aircraft and object acquisition system may include a mechanism designed to extend from the aircraft airframe (e.g., an acquisition, manipulation, and/or securing mechanism) to acquire the object, as well as one or more sensors to provide feedback signals necessary to stabilize the position of the object and/or the aircraft, which mitigates reliance on the aircraft design (e.g., landing and takeoff limitations) and broadens flight and/or acquisition capabilities.

In examples, the object acquisition system may be configured to provide the aircraft with information about the environment and the object through various feedback sensors to guide the aircraft's approach toward the object, as well as actions on acquisition and/or delivery of the object.

As will be discussed, the object acquisition system may be configured as a retrofit system to attach to any aircraft capable of carrying its system weight, making ever-improving, low-cost aircraft available for future use. The object acquisition system may include a separate processor to command the aircraft's controller to perform maneuvers to aid in precise manipulation, securing, transport, and delivery of objects. The disclosed object acquisition system may be employed in connection with various aircraft configurations, including, inter alia, VTOL aircraft and/or UAVs.

Figure 1A:
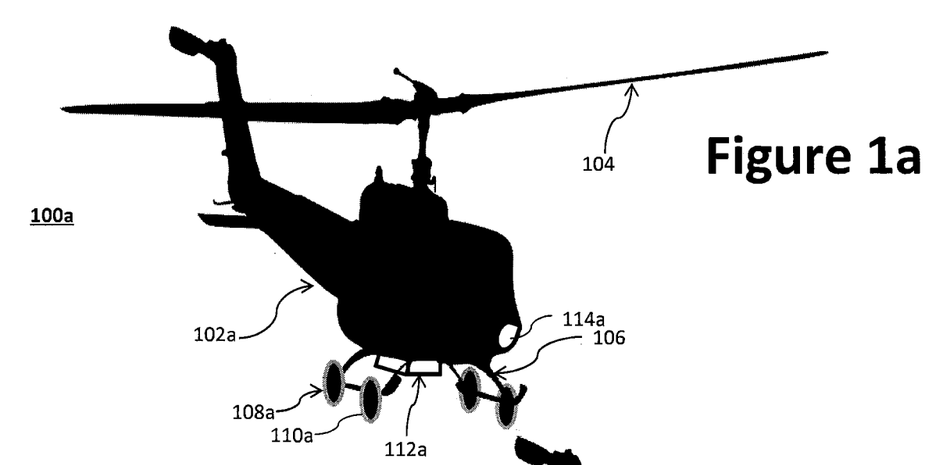
FIG. 1a illustrates an example vertical take-off and landing (VTOL) aircraft.

A suitable aircraft for use with an object acquisition system includes the VTOL aircraft 100a (e.g., a helicopter) illustrated in FIG. 1a. As illustrated, the VTOL aircraft 100a generally comprises an airframe 102 (e.g., a fuselage or other structure), a rotor 104 extending from the airframe 102, and landing gear 106. While a helicopter styled VTOL is illustrated in several figures, the teachings of the present disclosure may similarly be applied to other aircraft, including UAV (e.g., drones, such as multi-rotor aircraft), as well as fixed wing or other types of aircraft. Therefore, while the VTOL aircraft 100a is illustrated as having a single rotor 104, a person of skill in the art would understand that additional rotors may be employed (e.g., with a drone, larger VTOL aircraft, etc.) to achieve a desired function and depending on, for example, thrust requirements. Further, while a VTOL aircraft is illustrated, other aircraft may be employ and, therefore, the subject disclosure should not be limited to VTOL aircraft.

The landing gear 106 can include a ground based drive system 108a, designed to allow ground operations of the VTOL aircraft 100a once landed. The ground based drive system 108a includes a plurality of wheels 110a, which operate similarly to a wheeled drive system on the ground. The wheels 110a can be designed for a specific terrain (e.g., flat terrain, pavement, unimproved surfaces, wet/soft ground, etc.) as needed for a particular environment. The ground based drive system 108a can be configured to operate autonomously by use of algorithms (e.g., logic steps, machine learning, artificial intelligence systems), such as with the aid of one or more sensors 114a (e.g., LIDAR, radar-based sensor, optical sensor, acoustic sensor, temperature sensors, pressure sensors, infrared camera, ultraviolet, visible, near-infrared, short wave infrared, mid wave infrared, long wave infrared (LWIR), bolometer, electro-optical cameras, LED projection, structured light, multi-view reconstruction, stereo-cameras, antenna, etc.) to sense physical and environmental characteristics, which are used to direct the ground based drive system 108a to navigate, avoid obstacles, etc. In some examples, sensors are integrated with the landing gear 106 and/or the ground based drive system 108a, such as to provide feedback to inform the landing and/or drive capability of the VTOL aircraft 100a.

In examples, one or more of the sensors are 114a integrated with the VTOL aircraft 100a suite of existing, on-board sensors. As stated herein, the VTOL aircraft 100a may be configured to operate autonomously, such as during takeoff, flight, and landing. The VTOL aircraft 100a may additionally or alternatively be configured to communicate data from one or more of the on-board sensors to an object acquisition mechanism 112a to employ the data to make determinations to aid in the acquisition and/or delivery of objects, including selection of a landing zone, identifying and navigating a driving route to the object location, acquisition, transportation, and/or delivery of the object, etc.

The object acquisition mechanism 112a can be attached to the airframe 102a to manipulate and secure an object. The object acquisition mechanism 112a can be configured to operate autonomously, be configured to receive instruction from a human operator, or a combination of autonomous function and human direction. In some examples, the systems of the VTOL aircraft 100a are entirely autonomous. Thus, flight, ground travel, and object acquisition systems are configured to operate without human instructions. A series of algorithms or other instructions that are stored and run on a processor can inform and adjust the operation of each system (see, e.g., FIG. 4). Therefore, the VTOL aircraft 100a is designed for autonomous flight, ground movement, object acquisition and transport, as disclosed herein.

To prevent mechanical interference with the object acquisition system, the landing gear 106 may comprise a plurality of posts positioned along the perimeter of the VTOL aircraft 100a. The posts of landing gear 106 and the ground based drive system 108a may be fabricated as a singular unit, or as separate components to be coupled to one another.

Figure 1B:
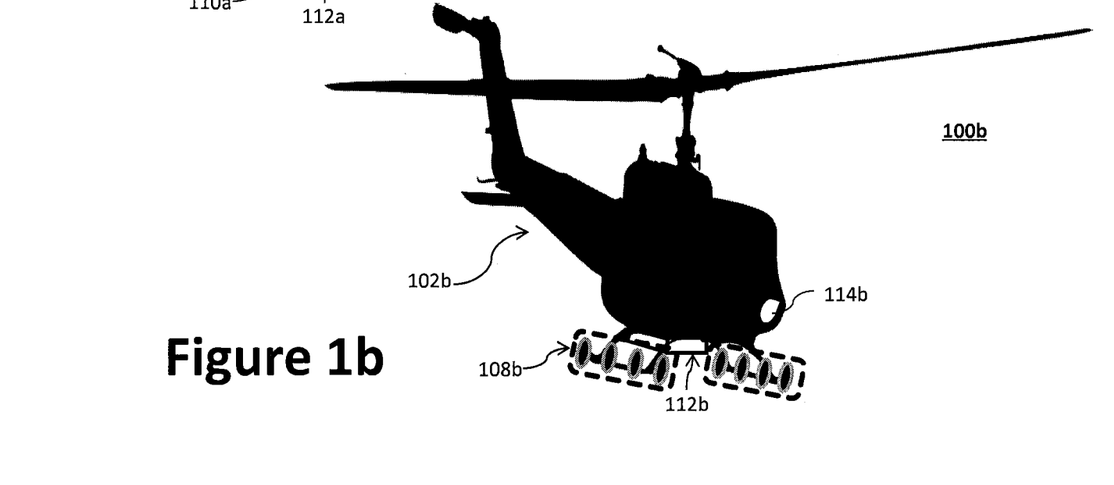
FIG. 1b illustrates another example VTOL aircraft.

FIG. 1b illustrates another example VTOL aircraft 100b control having an alternative ground based drive system 108b. In the example of FIG. 1b, the ground based drive system 108b is a tracked drive system configured to operate in a manner similar to ground based drive system 108a. The selection of a tracked system (e.g., 108b) versus a wheeled system (e.g., 108a) will derive from the expected terrain encountered during object acquisition operations. Thus, a tracked drive system may be selected for uneven surfaces or surfaces covered with debris, whereas a wheeled drive system may be suited for a relatively flat and/or uniform surface. In some examples, the ground based drive system 108a, 108b can be removed from the airframe 102a (e.g., from the landing gear 106) and replaced with another system type, thereby extending the usefulness of the system.

Figure 2A:
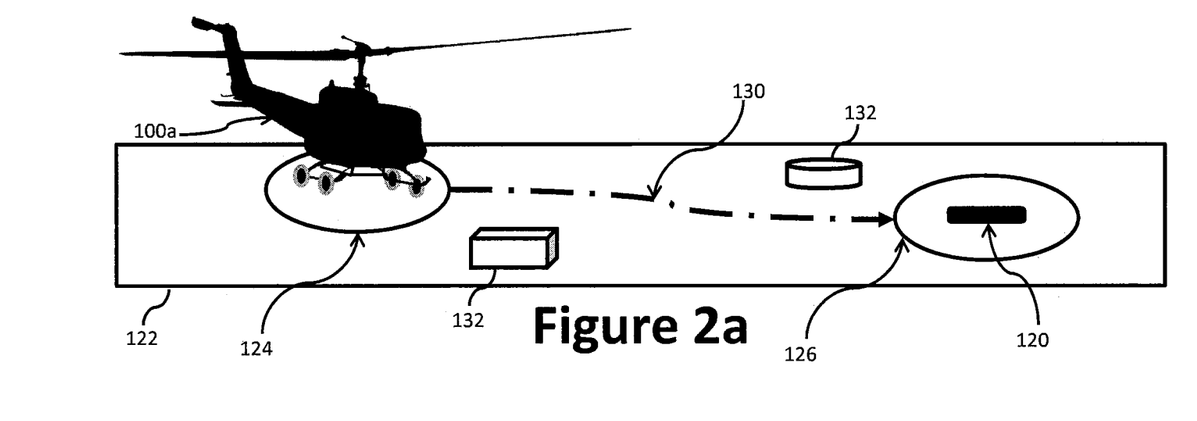
FIGS. 2a and 2b illustrate the VTOL aircraft of FIG. 1a operating an example ground based transportation system.
Figure 2B:
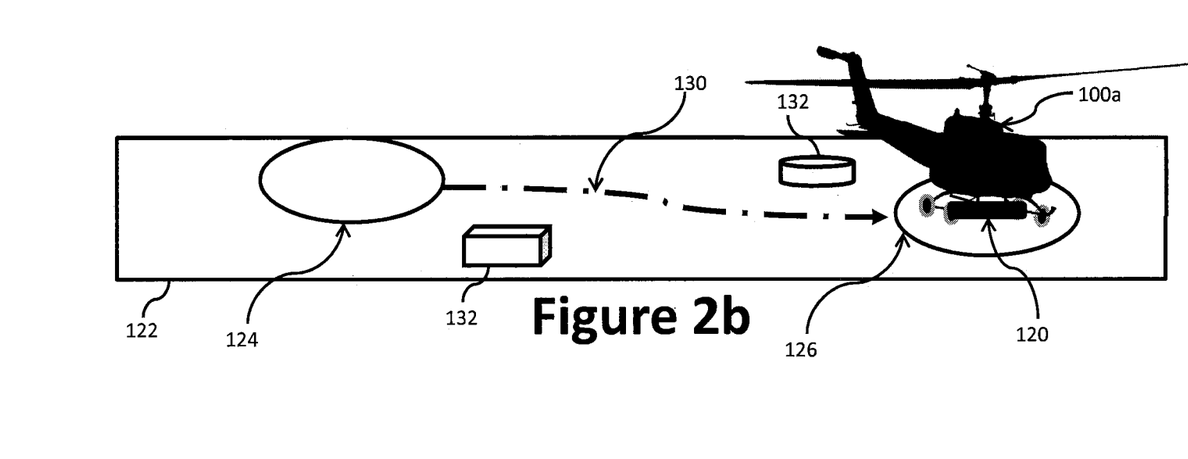

FIGS. 2a and 2b illustrate an example ground based operation. As shown, aircraft 100a identifies an object 120 located on a surface 122 (e.g., unimproved, austere ground) within an acquisition area 126. One or more systems of the aircraft 100a may identify characteristics of the environment of landing zone 124 at a distance from acquisition area 126 where the aircraft 100a can safely land without coming into contact with the object or otherwise damaging the aircraft 100a and/or the object 120. Once the aircraft 100a has landed, one or more sensors (e.g., sensor 114) can aid in determining distance and/or direction to the object 120, as well as one or more characteristics of the object 120. The characteristics can include dimensions such as height, length, and width, geometry, etc., of the object 120. In some examples, the object 120 may be configured with a remotely readable code (e.g., via optical signals such as color or distinguishable patterns, wireless signals, etc.) that contains information such as weight, durability, contents, securing instructions, etc. In examples, the object may be provided with a GPS or other beacon to convey location information to the VTOL aircraft 100a. Additionally or alternatively, information regarding the environment can be provided to the aircraft 100a via one or more sensors to determine a variety of factors, such as weather, terrain features, location of obstacles, etc.

This information, as well as stored and/or networked information regarding the aircraft 100a, the object 120, the environment, etc., can be provided to a processor of the VTOL aircraft 100a to aid in determining an approach pathway 130 to one or both of the landing zone 124 and the object 120, and the eventual acquisition of the object 120. For example, a processor of the aircraft 100a can identify one or more obstacles 132 along the approach pathway 130 and adjust accordingly. Additionally, the size and shape of the object 120 can inform from which angle and/or direction the aircraft 100a approaches, as well as whether an additional action is needed to facilitate effective acquisition. For instance, if the object acquisition mechanism 112a is located below the aircraft 100a, the height may be adjusted to accept a larger object 120. If the object 120 is fitted with a particular securing means (e.g., a winch hook-up, a pallet, an arrangement of slots on a container, etc.), the aircraft 100a can prepare a corresponding manipulation and/or securing mechanism and/or adjust the approach 130 to effectively acquire the object 120.

Figure 3A:
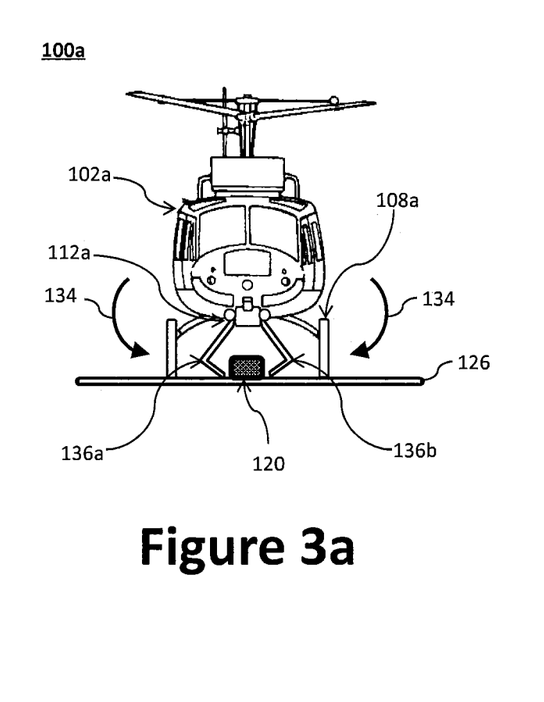
FIGS. 3a and 3b illustrate the VTOL aircraft of FIG. 1a operating an example object acquisition system.
Figure 3B:
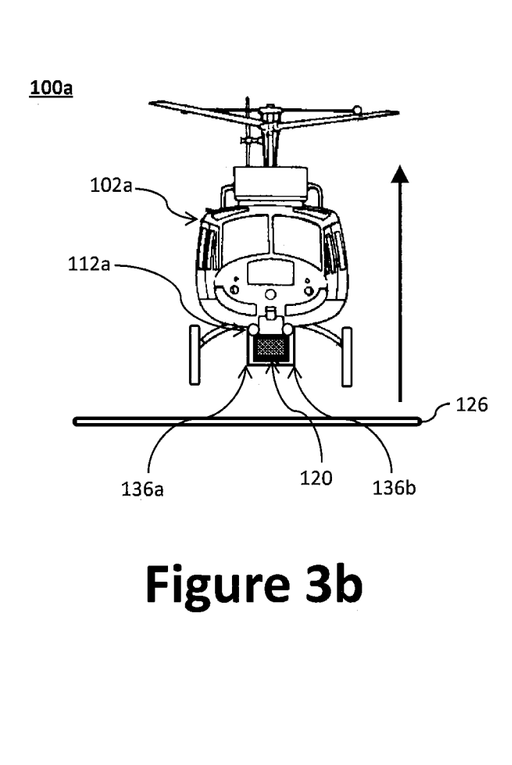

Once the aircraft 100a has reached the object 120 at acquisition area 126, the object acquisition mechanism 112a is deployed to acquire the object 120, as illustrated in FIGS. 3a and 3b. For example, the object acquisition mechanism 112a may be configured to perform one or more of the following tasks: manipulate (e.g., position and/or orient) the object 120; lift the object 120 from the surface; and/or secure (e.g., latch) the object 120 to the VTOL aircraft 100a. In general terms, these capabilities are described as being performed by an object manipulation mechanism or system, a lifting mechanism, a latching mechanism, and/or a securing mechanism, all of which are collectively identified as or part of object acquisition mechanism 112a.

FIG. 3a illustrates the aircraft 100a with object acquisition mechanism 112a extending downward from the airframe 102a. As shown, the object acquisition mechanism 112a includes two robotic arms 136a, 136b arranged on two sides of the object 120. The deployed robotic arms 136a, 136b can be operated to slide underneath the object 120, thereby lifting the object 120 up toward the airframe 102a when the robotic arms 136a, 136b are rotated inward, as shown by arrows 134. Having manipulated the object 120, the robotic arms 136a, 136b are retracted, thereby securing the object to the airframe 102a, as shown in FIG. 3b. Once secured, the aircraft 100a may be configured for flight, and will take off to transport the object 120.

Although illustrated as a single mechanism, the object acquisition mechanism 112a can include separate manipulation and securing mechanisms. For example, robotic arms 136a, 136b may manipulate the object 120, such as adjust a position of the object 120, to facilitate a separate mechanism to secure the object 120. If the object 120 is to be secured by a winch, for example, the robotic arms 136a, 136b may push, pull, lift, or otherwise orient the object 120 into a position where the winch can link onto a suitable hook mounted on the object 120. Additionally or alternatively, the robotic arms 136a, 136b can position the object 120 into a compartment of the airframe 102a (e.g., internal or external to the airframe 102a), such that the object 120 is transported internally to the airframe 102a.

In some examples, the robotic arms 136a, 136b comprise one or more of a robotic grabber, grasper or grippers. The robotic arms 136a, 136b serve as the part of the object acquisition system 112a that interacts with the object 120 and/or the environment. Suitable mechanisms for manipulation, transportation, and delivery of objects 120 include grippers, magnets, and vacuum cups (e.g., suction cups). The robotic arms 136a, 136b may further include other devices to monitor the environment, such as anti-collision sensors and cameras. In certain aspects, the robotic arms 136a, 136b may be interchangeable. To that end, a quick connect device may be provided at a distal end of the robotic arms 136a, 136b to physically and communicatively engage a corresponding quick connect device positioned on the robotic arms 136a, 136b. To that end, the quick connect device may provide two mating parts, a master-side and a tool-side designed to lock or couple together, carry a payload, and have the ability to pass utilities such as electrical signals, pneumatic, water, etc.

For secure acquisition and/or delivery of the object 120, the robotic arms 136a, 136b may provide sensor feedback to the VTOL aircraft 100a via the object acquisition system 112a (e.g., to aircraft processor 202 of FIG. 4) to adjust the orientation of the robotic arms 136a, 136b. For example, pressure sensors (e.g., touch), coupled with distance sensors, can help both the object acquisition system 112a and the VTOL aircraft 100a to orient the robotic arms 136a, 136b with regard to the object 120, and to ensure that the object 120 is secure. Accordingly, the robotic arms 136a, 136b may include feedback sensors to provide feedback to the VTOL aircraft 100a about the object 120 and/or an environment adjacent or near the object 120.

Other feedback sensors may include, for example, pressure transducers, touch sensors, etc. Touch sensing is used to facilitate impedance control of the object acquisition system 112a and can be achieved using pressure sensors embedded in cast rubber. For example, tactile sensors (e.g., pressure transducers or strain gauges) may be placed on a surface of the robotic arm at a position to make contact with the object 120. Additionally, the motors that drive gears of the robotic arms 136a, 136b could be used to perform tactile feedback through current sensing in the motor circuit. The object acquisition system 112a can use information from the optical module to plan an approach route to quickly move the robotic arms 136a, 136b and touch sensors toward the object 120. For instance, the robotic arms 136a, 136b may include an active gripper with multiple finger members, although other forms of grippers are contemplated to provide a desired grip force, such as pinching, entrapment, capture, and vacuum suction.

Moreover, although the object acquisition mechanism 112a is illustrated as positioned beneath the airframe 102a, the object acquisition mechanism 112a can be located on one or more sides, in addition to or instead of the underside. For example, the object acquisition mechanism 112a may extend outward from one or both sides of the VTOL aircraft 100a for manipulation, acquisition, and/or storage of one or more objects. In such a configuration, the object acquisition mechanisms 112a may be adjustable and/or removably attached to the VTOL aircraft 100a, such that a variety of mechanisms may be employed. A compartment or other feature may additionally or alternatively operate with a side mounted object acquisition mechanism 112a for securing and transporting the object(s). By this configuration, the object acquisition mechanism 112a is less restricted by the height of the VTOL aircraft 100a and may allow for a variety of delivery options (e.g., the object 120 may be more easily removed by another mechanical system and/or human operator).

Figure 4:
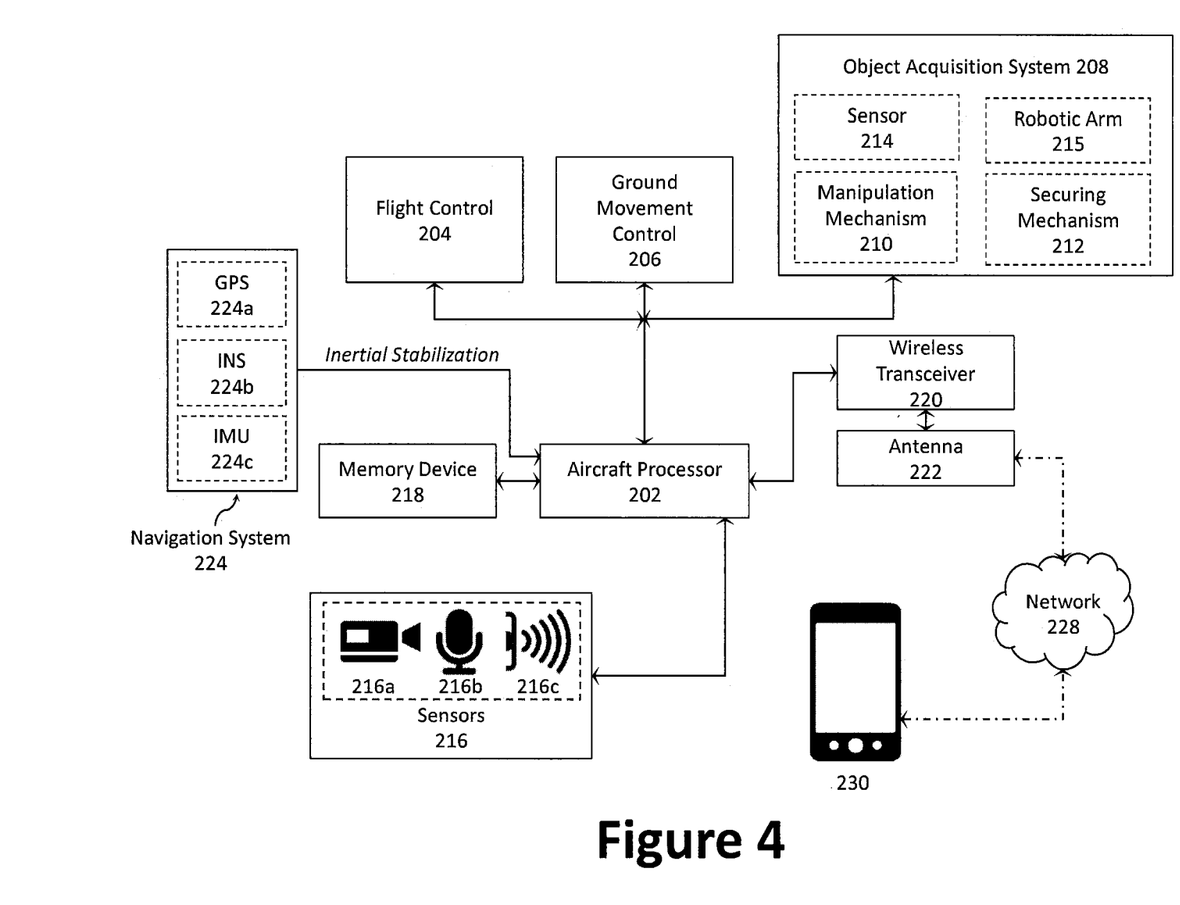
FIG. 4 illustrates an example diagram of an integrated architecture for an aircraft processor.

FIG. 4 illustrates a block diagram of an aircraft based object acquisition system configured to control the various components and functions of the VTOL aircraft 100a, 100b. As illustrated, the VTOL aircraft 100a, 100b includes one or more aircraft processors 202 communicatively coupled with at least one memory device 218, an object acquisition system 208 (e.g., object acquisition mechanism 112a), a flight controller 204, a wireless transceiver 220, and a navigation system 224. The aircraft processor 202 may be configured to perform one or more operations based at least in part on instructions (e.g., software) and one or more databases stored to the memory device 218 (e.g., hard drive, flash memory, or the like).

The aircraft control system may further include other desired services, such as a wireless transceiver 220 coupled with an antenna 222 to communicate data between the VTOL aircraft 100a, 100b and a remote device 230 (e.g., portable electronic devices, such as smartphones, tablets, and laptop computers) or other controller (e.g., a base station). For example, the VTOL aircraft 100a, 100b may communicate data (processed data, unprocessed data, etc.) with the remote device 230 over a network 228. In certain aspects, the wireless transceiver 220 may be configured to communicate via radiofrequency communication methods, for example, using one or more wireless standards, such as Wi-Fi (e.g., Institute of Electrical and Electronics Engineers' (IEEE) 802.11 standards), etc. The remote device 230 may facilitate monitoring and/or control of the VTOL aircraft 100a, 100b and its payload(s), including the object acquisition system 208 and sensors 216. In some examples, a wired connection can be employed to communicate with external systems, such as during object acquisition and/or delivery.

The aircraft processor 202 may be operatively coupled to the flight controller 204 to control operation of the various actuators (e.g., those to control movement of any flight component, such as a rotor and/or lift motor) in response to commands from an operator, autopilot, a navigation system 224, sensor, or other high-level system via the wireless transceiver 220. In certain aspects, the aircraft processor 202 and the flight controller 204 may be integrated into a single component or circuit. In operation, the flight controller 204 may dynamically (i.e., in real-time or near real-time) and independently adjust thrust levels of the VTOL aircraft 100a, 100b during the various phases of flight (e.g., take-off, cruising, landing) to control roll, pitch, or yaw of the VTOL aircraft 100a, 100b. In other words, the flight controller 204 can independently control the lift motors on the rotor 104 to generate a desired lift thrust for the VTOL aircraft 100a, 100b. For example, when rotors with rotor blades (e.g., propellers) are used, the flight controller 204 may vary the revolutions per minute (RPM) of the rotor and/or, where desired, vary the pitch of the rotor blades.

The aircraft processor 202 may be operatively coupled to the navigation system 224, which may include a global positioning system (GPS) 224a that is communicatively coupled with an Inertial Navigation System (INS) 224b and/or an inertial measurement unit (IMU) 224c, which can include one or more gyros and accelerometers. The GPS 224a gives an absolute drift-free position value that can be used to reset the INS solution or can be blended with it by use of a mathematical algorithm, such as a Kalman Filter. The navigation system 224 may communicate, inter alia, inertial stabilization data to the aircraft processor 202, which may be used during flight, landing and takeoff, as well as to facilitate operation of the object acquisition system 208.

To collect data and/or monitor an area, the VTOL aircraft 100a, 100b may further be equipped with one or more sensors 216 (e.g., sensors 114a) comprising, for example, one or more cameras 216a (e.g., an optical instrument for recording or capturing images and/or video, including light detection and ranging (LIDAR) devices), audio devices 216b (e.g., microphones, echolocation sensors, etc.), and other sensors 216c to facilitate system functionality and provide data (e.g., photographs, video, audio, sensor measurements, etc.). The sensors 216 are operatively coupled to the aircraft processor 202 to facilitate communication between the sensors 216 and the aircraft processor 202. The data may be used to navigate the VTOL aircraft 100a, 100b and/or control operation of the object acquisition system 208. The sensors 216 may be in a fixed position relative to the airframe, and/or rotatably and pivotally coupled to, for example, the underside surface of the airframe 102 (or another structural component) via a gimbal system to enable the sensors 216 to be more easily oriented downward to monitor objects below and/or on the ground. The data may be dynamically or periodically communicated from the VTOL aircraft 100a, 100b to the remote device 230 over the network 228 via the wireless transceiver 220, or stored to the memory device 218 for later access or processing.

The aircraft processor 202 may be operatively coupled with a system that provides environmental data, based at least in part on sensor readings and/or known navigational maps (e.g., a map of the environment reflecting obstacles and/or boundaries), which may be loaded and stored to the VTOL aircraft 100a, 100b (e.g., at the memory device 218). In certain aspects, the navigation system 224 may employ sensor data from the sensors 216 to determine the VTOL aircraft 100a, 100b position within an environment.

The aircraft processor 202 may be operatively coupled with the object acquisition system 208 to provide two-way communication between the object acquisition system 208 (e.g., acquire sensor data and/or transmit commands) and the aircraft processor 202. In operation, the aircraft processor 202 may communicate object-relative stabilization data to the object acquisition system 208 and receive from the object acquisition system 208 position commands/data. For example, commands may be communicated to the object acquisition system 208 from the aircraft processor 202 based at least in part on commands from an operator, autopilot, the navigation system 224, the sensors 216, or other high-level systems. Further, feedback from the object acquisition system's 208 sensors 214 contact with surfaces of the object, as well as position sensing of the object to be grasped and emplaced, can aid in a determination on where to land, how to secure the object, etc.

As disclosed in FIG. 4, the object acquisition system 208 generally includes an object manipulation mechanism 210, an object securing mechanism 212, and one or more sensors 214. The object acquisition system 208 may employ a robotic arm 215, for example, mounted to the airframe 102a, 102b and may have, for example, a gimbal system or a U-shaped bracket to facilitate movement in multiple directions (e.g., six degrees of freedom).

The object manipulation mechanism 210 and/or securing mechanism 212 may be coupled to the airframe 102a, 102b via the robotic arm 215 (e.g., robotic arms 136a, 136b) to position and secure the object, respectively, in preparation for transport. For example, a function of the robotic arm 215 is to increase the reach from the object acquisition system 208. To that end, the robotic arm 215 may be a telescoping boom, which may employ an actuator assembly, such as a ball screw/nut assembly driven (e.g., adjusted in length) by an electric motor or other actuator. The various hardware associated with the object acquisition system 208 may be fabricated from one or more lightweight materials, including metals, metal alloys, plastics (e.g., 3D printed plastic), and/or composite materials. The robotic arm 215 may employ, for example, brushless DC back-driveable motors. In operation, the robotic arm 215 may be independently controlled to raise and lower relative to the VTOL aircraft 100a, 100b via the object acquisition system 208.

Additional sensing from sensors 214 can provide the VTOL aircraft 100a, 100b with information to position itself with respect to the object 120 and to navigate toward and/or grasp the object 120. For example, as will be discussed, the robotic arm 215 may be provided with a depth camera and/or one or more touch sensors to measure relative orientation of the robotic arm 215 vis-à-vis the object 120. Information from the one or more sensors 214 reflecting, for example, the object acquisition system's 208 kinematic state can be communicated to the aircraft processor 202 to provide information about the VTOL aircraft 100a, 100b precise position with respect to object 120. This information enhances localization and navigation of the VTOL aircraft 100a, 100b to enable precise grasping of the object 120.

Although described as operating on a single processor (e.g., aircraft processor 202) two or more processors can be employed for specific functions. For example, each of the flight controller 204, ground movement control 206, and object acquisition system 208 can have dedicated processors, which communicate with each other, as well as the aircraft processor 202.

Once the object 120 is acquired, the object securing mechanism 212 may stabilize the object 120 during transport to prevent, for example, any potential dislodging. For example, stabilization control can be performed using, for example, a single spring-damper gain setting that is selected using optimization and does not actively read accelerometer data, or through active vibration identification and suppression by reading accelerometer data on the VTOL aircraft 100a, 100b and/or the object 120. In one example, the object securing mechanism 212 may assume the stowed position of FIG. 3b, whereby the object 120 is secured in place under the airframe 102a. This stowed configuration brings the robotic arm 215 and object 120 close to the UAV's center of mass, which provides the VTOL aircraft 100a, 100b with favorable flight dynamics.

As disclosed, the robotic arm 215 is the part of the object acquisition system 208 that interacts with the object 120 and the environment. Suitable mechanisms for manipulation, transportation, and emplacement of objects 120 include grippers, magnets, and vacuum cups. For example, where the VTOL aircraft 100a, 100b needs to pick up the object 120, a gripper may be employed as a robotic arm 215. Where the VTOL aircraft 100a, 100b must perform other operations to otherwise manipulate and/or secure the object, the robotic arm 215 may employ various end effectors, such as brushes, cutting tools, drills, sanders, screwdrivers, spray guns, and welding guns. The robotic arm 215 may further include other devices to monitor the environment, such as anti-collision sensors and cameras.

In certain aspects, the robotic arm 215 may be interchangeable. To that end, a connection interface may be provided at a distal end of the robotic arm 215 to physically and communicatively engage a corresponding quick connect device positioned on the robotic arm 215. To that end, the quick connect device may provide two mating parts, a master-side and a tool-side designed to lock or couple together, carry a payload, and have the ability to pass utilities such as electrical signals, pneumatic, water, etc. Accordingly, via the quick connect device, an operator would be enabled to interchange quickly replace the type of robotic arm 215 installed on the aircraft.

For optimal manipulation and securing of the object 120, the robotic arm 215 may provide sensor feedback via the object acquisition system 208 (e.g., to the aircraft processor 202) to adjust the orientation of the object manipulation mechanism 210 and/or the object securing mechanism 212.

For example, pressure sensors (e.g., touch), coupled with distance sensors, can help both the object acquisition system 208 and the VTOL aircraft 100a, 100b to orient the robotic arm 215 with regard to the object 120, and to ensure that the object 120 is securely grasped. Accordingly, the robotic arm 215 may include feedback sensors to provide feedback to the aircraft processor 202 about the object 120 and/or an environment adjacent or near the object 120.

The sensors 214 may include an optical module, for example, having an infrared (IR) camera, a RGB (red/green/blue) camera, a laser projector, etc. The optical module may be positioned toward the back of the robotic arm 215 configured with a forward field of view to capture images of the object 120 and environment. The sensors 214 may employ one or more sensing technologies to achieve depth perception, 3D imaging, interior mapping, and feature tracking. The IR camera, together with the IR laser projector, provide depth information to calculate a spatial relationship between robotic arm 215 and the object 120. To that end, the IR camera may be one of a pair of cameras, spaced apart from one another to capture different perspective views (e.g., angles) of the object 120 and environment. Using this data, the object acquisition system 208 (via a respective processor) can determine the location of the object 120 in a local space with respect to the robotic arm 215 to a high resolution. In certain aspects, one or more of the sensors 214 may be existing onboard sensors of the VTOL aircraft 100a, 100b. For example, where the VTOL aircraft 100a, 100b comprises sensors to enable the VTOL aircraft 100a, 100b to land autonomously, one or more of such sensors may be used as sensors 214.

Other feedback sensors may include, for example, pressure transducers, touch sensors, etc. Touch sensing is used to facilitate impedance control of the object acquisition system 208 and can be achieved using pressure sensors which may be embedded in cast rubber. For example, tactile sensors (e.g., pressure transducers or strain gauges) may be placed on a surface of the robotic arm 215 at a position to make contact with the object 120. Additionally, the motors that drive gears of robotic arm 215 could be used to perform tactile feedback through current sensing in the motor circuit. The object acquisition system 208 can use information from the optical module to plan an approach route to quickly move the robotic arm 215 and its touch sensors toward the object 120. For instance, the robotic arm 215 may be an active gripper with multiple finger members, although other forms of grippers are contemplated to provide a desired grip force, such as pinching, entrapment, capture, and vacuum suction.

The object acquisition system 208 may further employ barcodes (e.g., positioned on the object 120) to identify the object 120 via the sensor 214. Multiple fiducial markers (e.g., April tags or ARtags) on the robotic arm 215 can aid in the determination of the exact position of the robotic arm 215. The aircraft processor 202, via the sensor 214, may be configured to track the fiducial markers.

Figure 5:
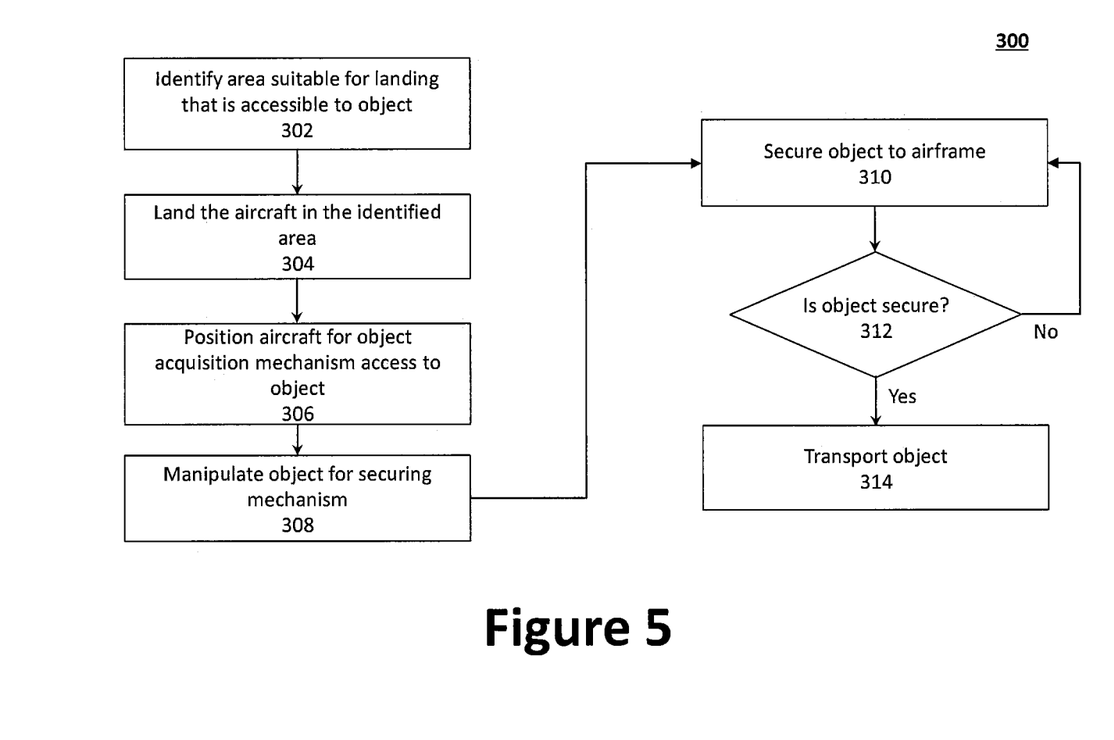
FIG. 5 illustrates an example method for use with an object acquisition system.

FIG. 5 illustrates a method 300 of manipulating an object from an aircraft based system. In block 302, the system identifies (e.g., via one or more sensors 214) an area (e.g., landing zone 124) that is both suitable for landing an aircraft (e.g., aircraft 100a, 100b) and accessible to an object (e.g., object 120) via a ground based path (e.g., approach pathway 130). In block 304, the aircraft lands in the identified area, using landing gear (e.g., landing gear 106) equipped with a ground based movement system (e.g., ground based drive system 108a, 108b).

Once landed, the aircraft is positioned such that the object is accessible to an object acquisition mechanism (e.g., object acquisition mechanism 112a) via the ground based movement system, in block 306. In block 308, the object is positioned relative to the aircraft by a manipulation mechanism (e.g., object manipulation mechanism 210) of the object acquisition mechanism. In block 310, the object is secured to the aircraft by a securing mechanism (e.g., object securing mechanism 212) of the object acquisition mechanism based at least in part on the physical characteristic. In block 312, the system determines whether the object is secured to the airframe. In block 314, the aircraft transports the secured object (e.g., by flight and/or ground movement).

In an example autonomous system, the method 300 can be executed by various logic routines, informed by the plural sensors, with information provided by stored media, which can include trend analysis from previous operations, networked information, etc., to effectively identify, approach, secure, and transport an object, without the need for human intervention.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the teachings of the subject disclosure may therefore be practiced otherwise than as specifically described above.

What is claimed is:

1. An aircraft-based autonomous object acquisition system for use with an aircraft having an airframe, the aircraft-based autonomous object acquisition system comprising:
   one or more sensors configured to sense flail physical characteristics of an object at an acquisition area and an environment surrounding the acquisition area;
   an object acquisition mechanism configured to couple to the airframe and to manipulate and secure the object relative to the airframe;
   a ground based movement system configured to position the airframe such that the object is accessible to the object acquisition mechanism; and
   a processor communicatively coupled with each of the aircraft, the one or more sensors, the object acquisition mechanism, and the ground based movement system, the processor being configured to:
      identify the object at the acquisition area and a landing zone relative to the acquisition area using sensor data from the one or more sensors;
      control the aircraft to land at the landing zone autonomously;
      determine an approach pathway between the landing zone and the object using the sensor data;
      control operation of the ground based movement system to navigate along the approach pathway autonomously toward the object using the sensor data; and
      control the object acquisition mechanism to pick up the object using the sensor data.

2. The aircraft-based autonomous object acquisition system of claim 1, wherein the one or more sensors comprises at least one of a radar, a LIDAR, an IR, a sonar, or an optical sensor.

3. The aircraft-based autonomous object acquisition system of claim 2, wherein the one or more sensors comprises a red/green/blue (RGB) camera.

4. The aircraft-based autonomous object acquisition system of claim 1, wherein the object acquisition mechanism comprises a manipulation mechanism to adjust a position of the object and a securing mechanism to secure the object to the airframe.

5. The aircraft-based autonomous object acquisition system of claim 4, wherein the object acquisition mechanism is configured to removably couple to the aircraft.

6. The aircraft-based autonomous object acquisition system of claim 4, wherein the securing mechanism is removably coupled with the object acquisition mechanism to enable the securing mechanism to be interchanged with a different securing mechanism.

7. The aircraft-based autonomous object acquisition system of claim 4, wherein the securing mechanism comprises at least one of a robotic arm, a winch, or a magnet.

8. The aircraft-based autonomous object acquisition system of claim 1, wherein the object acquisition mechanism is configured to move independently of the ground based movement system to allow the aircraft to move while the object acquisition mechanism maintains contact with the object.

9. The aircraft-based autonomous object acquisition system of claim 1, wherein the object acquisition mechanism is further configured to secure the object externally to the airframe.

10. The aircraft-based autonomous object acquisition system of claim 1, wherein the ground based movement system comprises landing gear for the aircraft.

11. The aircraft-based autonomous object acquisition system of claim 10, wherein the ground based movement system comprises a wheeled system or a track system.

12. The aircraft-based autonomous object acquisition system of claim 1, wherein the object acquisition mechanism comprises one or more feedback sensors to provide feedback data to the processor when interacting with the object.

13. The aircraft-based autonomous object acquisition system of claim 12, wherein the one or more feedback sensors comprises an optical sensor or a pressure sensor communicatively coupled with the processor.

14. The aircraft-based autonomous object acquisition system of claim 1, wherein the object comprises a marker to aid in determining a physical characteristic of the object.

15. The aircraft-based autonomous object acquisition system of claim 1, wherein the object comprises a remotely-readable code representative of a physical characteristic of the object.

16. The aircraft-based autonomous object acquisition system of claim 15, wherein the physical characteristic is one of height, length, width, weight, or shape of the object.

17. The aircraft-based autonomous object acquisition system of claim 1, wherein the object acquisition mechanism is mounted to a side of the airframe.

18. The aircraft-based autonomous object acquisition system of claim 1, wherein the object acquisition mechanism is removable coupled to the airframe to provide a retro-fit system.

19. The aircraft-based autonomous object acquisition system of claim 15, wherein the remotely-readable code is a pattern positioned on the object.

20. The aircraft-based autonomous object acquisition system of claim 1, wherein the processor is configured to image the object from the landing zone to determine the approach pathway.

21. The aircraft-based autonomous object acquisition system of claim 20, wherein the processor is configured to identify obstacles along the approach pathway and adjust the approach pathway to avoid the obstacles dynamically.

22. An aircraft-based autonomous object acquisition system for use with an aircraft, the aircraft-based autonomous object acquisition system comprising:
  one or more sensors configured to sense physical characteristics of an object at an acquisition area and an environment surrounding the acquisition area;
  an object acquisition mechanism configured to couple to the aircraft and to secure the object relative to the aircraft;
  a ground based movement system configured to transport the aircraft across a ground surface from a landing zone to the acquisition area such that the object is accessible to the object acquisition mechanism; and
  a processor communicatively coupled with each of the aircraft, the one or more sensors, the object acquisition mechanism, and the ground based movement system, the processor being configured to:
    identify the landing zone and land the aircraft at the landing zone autonomously using sensor data from the one or more sensors;
    identify the object from the landing zone and determine an approach pathway between the landing zone and the object using the sensor data;
    control operation of the ground based movement system to navigate along the approach pathway autonomously toward the object using the sensor data, wherein the processor is configured to adjust the approach pathway to avoid obstacles along the approach pathway; and
    control, once at the acquisition area, the object acquisition mechanism to pick up the object using the sensor data.

* * * * *